(12) United States Patent
Greenberg

(10) Patent No.: US 11,833,939 B2
(45) Date of Patent: Dec. 5, 2023

(54) SEAT HARNESS SYSTEM

(71) Applicant: Tzvi Greenberg, Brooklyn, NY (US)

(72) Inventor: Tzvi Greenberg, Brooklyn, NY (US)

(73) Assignee: Tzvi Greenberg, Brooklyn, NY (US)

( * ) Notice: Subject to any disclaimer, the term of this patent is extended or adjusted under 35 U.S.C. 154(b) by 0 days.

(21) Appl. No.: 17/728,595

(22) Filed: Apr. 25, 2022

(65) Prior Publication Data

US 2022/0242280 A1  Aug. 4, 2022

Related U.S. Application Data

(63) Continuation of application No. 16/948,434, filed on Sep. 18, 2020, now Pat. No. 11,312,270.

(60) Provisional application No. 62/901,925, filed on Sep. 18, 2019.

(51) Int. Cl.
*B60N 2/28* (2006.01)
*B60R 22/10* (2006.01)
*B60R 22/26* (2006.01)

(52) U.S. Cl.
CPC .......... *B60N 2/2812* (2013.01); *B60R 22/105* (2013.01); *B60R 22/26* (2013.01)

(58) Field of Classification Search
CPC ...... B60N 2/2812; B60R 22/105; B60R 22/26
See application file for complete search history.

(56) References Cited

U.S. PATENT DOCUMENTS

| | | | | |
|---|---|---|---|---|
| 3,034,596 A | * | 5/1962 | Twaits, Jr. ............. | B64D 17/32 297/467 |
| 5,562,326 A | * | 10/1996 | Stroud .................... | B60R 22/14 297/485 |
| 6,367,882 B1 | * | 4/2002 | Van Druff ............... | B60R 22/12 297/484 |
| 9,227,527 B2 | * | 1/2016 | Pfister .................... | B60R 22/26 |

* cited by examiner

*Primary Examiner* — Anthony D Barfield
(74) *Attorney, Agent, or Firm* — Tarter Krinsky & Drogin LLP

(57) ABSTRACT

A seat harness system having a harness plate lockable to a seat to form a five-point harness system for the seat. The harness plate is operatively associated with harness strapping, which is associated with a harness positioning system, which in turn is associated with an actuator to form a singular system that requires only a single action to release all five-points harness system by way of the actuator and the harness positioning system.

5 Claims, 4 Drawing Sheets

SEAT HARNESS SYSTEM

CROSS-REFERENCE TO RELATED APPLICATION

This application is a continuation of and claims benefit to U.S. patent application Ser. No. 16/948,434, filed on Sep. 18, 2020, entitled "Seat Harness System", which issued as U.S. Pat. No. 11,312,270 on Apr. 26, 2022, which claims the benefit of priority of U.S. provisional application No. 62/901,925, filed Sep. 18, 2019, the contents of which are herein incorporated by reference.

BACKGROUND OF THE INVENTION

The present invention relates to seat harness systems and, more particularly, a single piece, single-action, five-point chest harness for children's car seats.

As many a parent knows, strapping a child into a car seat can be a hassle, if not risky. Car seats can be frustrating to use because their harness system can loosen and twist over time, making them prone to human neglect. Moreover, the strapping of the harness system can be uncomfortable for children when being strapped in or when being unstrapped. The strapping can take time and try one's patience to secure, thus inviting the risk of human error and neglect.

As can be seen, there is a need for a single piece, single-action, five-point chest harness for children's car seats, eliminating the hassle and risk associated with strapping a child into a car seat.

The present invention embodies a single piece, five-point chest harness that can be released in a single action—as opposed to the necessary six actions required for current five-point strap harness systems—by replacing straps and buckles with a single-piece, five-point chest plate harness. The systemic harness may be affixed to a retracting system that enables that harness to be released and raised to an open position as well as moved to a closed position and secured in a single action.

As a single piece, which may be preset to a specific size of range of possible sizes—for instance, a specific child's size—the risks of loosening or twisting of the strapping over time is obviated as opposed to the current five-point strap systems. As a result, the present invention is easier and more efficient to use, while providing the same level of safety as current five-point strap harness systems.

SUMMARY OF THE INVENTION

In one aspect of the present invention, a harness system includes the following: a harness plate movable between an unlocked engagement and a locked engagement forming harness configuration having a plurality of points relative to an object operatively associated thereto, wherein each point is moved to the unlocked engagement with a single input to the harness plate; an actuator operatively associated with the harness plate by a mechanical connection and by a control signal synchronous with the single input, wherein the control signal activates the actuator in such a way that each point of the plurality of points is moved to the unlocked engagement; a harness positioning system interconnecting the harness plate and the mechanical connection, wherein the harness positioning system includes the following a harness strapping interconnecting the harness plate and a lever arm, wherein the harness strapping defines more than one of the plurality of points; a fulcrum point operatively associated with the object and the lever arm; and the lever arm providing the mechanical connection along a distal end thereof; a plate pivot point provided along a proximal end of the lever arm, wherein the mechanical connection is a pivotable connection, and wherein the harness strapping interconnects the harness plate in a pivotable manner.

In another aspect of the present invention, a seat harness system includes the following: a harness plate having a lock mechanism enabling the harness plate to move between a locked engagement and an unlocked engagement with a seat; a proximal end of a harness strapping pivotably connected to the harness plate; a proximal end of a lever arm pivotably connected to a distal end of the harness strapping; an actuator operatively associated with a distal end of the lever arm; and a fulcrum operatively associated with the lever arm and the seat, the fulcrum about which the lever arm moves when the actuator is activated by a control signal sent from the harness plate when moved to the unlocked engagement, wherein the actuator is housed in a recessed pocket provided by the seat; and two side arms extending from the harness plate in such a way the two side arms, the lock mechanism and the harness strapping define a five-point harness configuration relative to the seat when the harness plate is in the locked engagement.

These and other features, aspects and advantages of the present invention will become better understood with reference to the following drawings, description and claims.

DETAILED DESCRIPTION OF THE INVENTION

Figure 1:
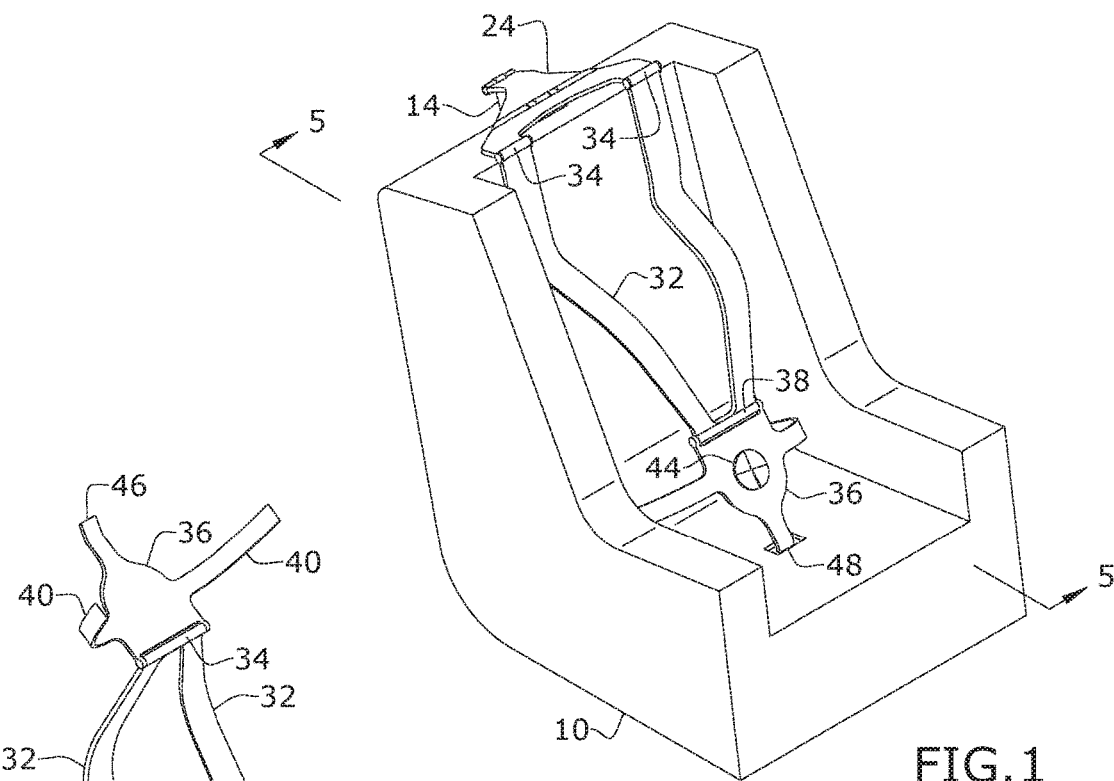
FIG. 1 is a perspective view of an exemplary embodiment of the present invention shown in a closed position.
Figure 2:
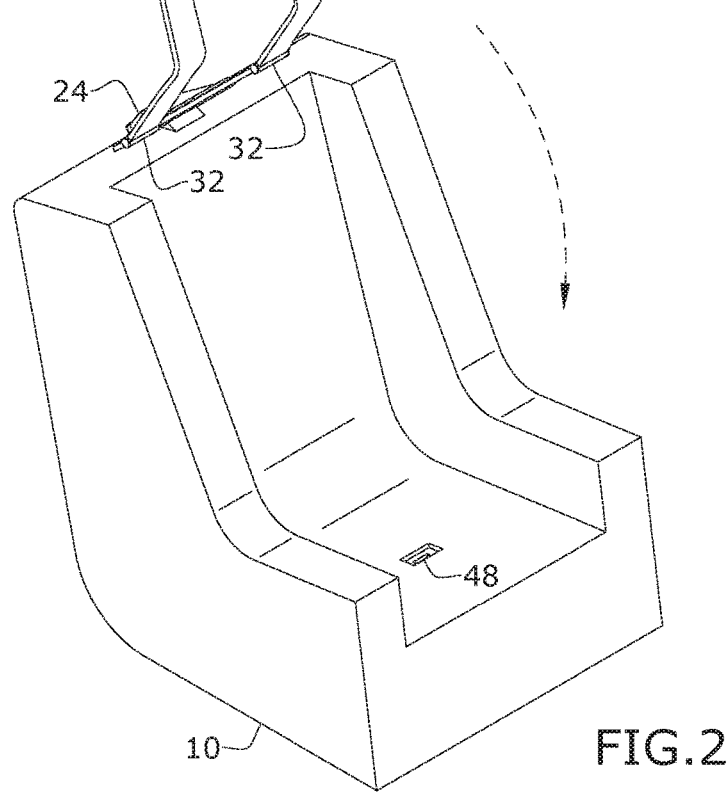
FIG. 2 is a perspective view of an exemplary embodiment of the present invention shown in an open position.
Figure 3:
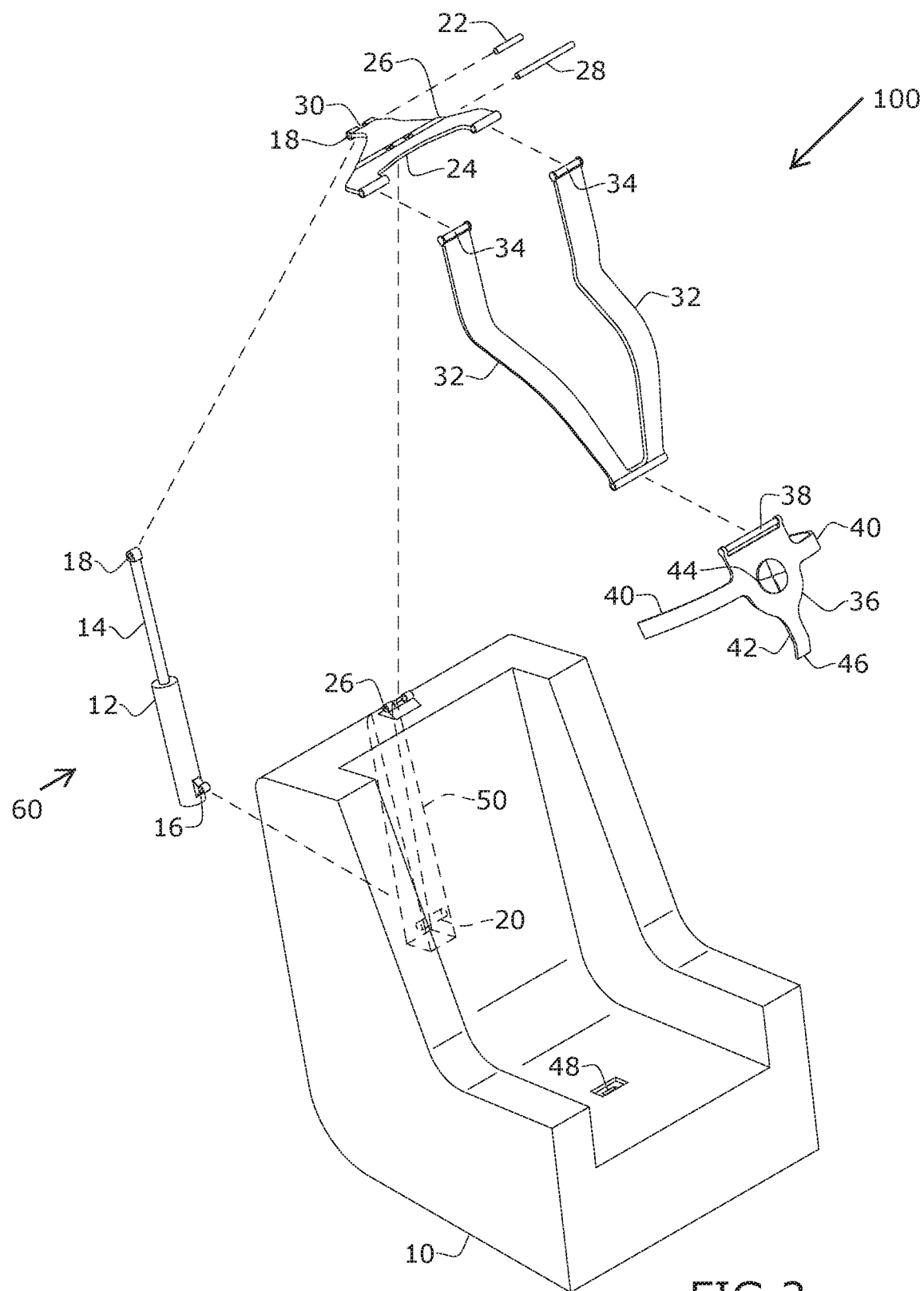
FIG. 3 is an exploded perspective view of an exemplary embodiment of the present invention.
Figure 4:
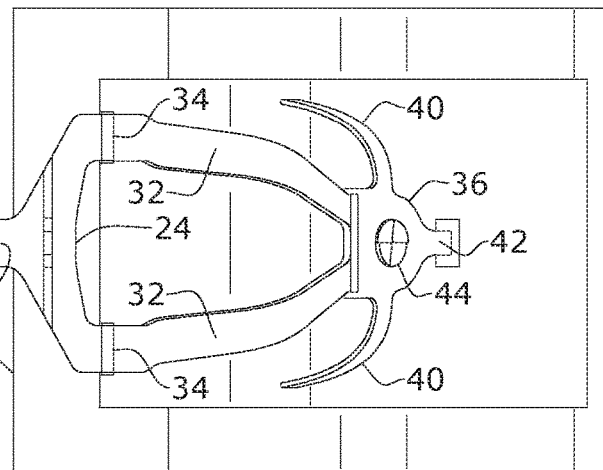
FIG. 4 is a top plan view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Referring now to FIGS. 1 through 6, the present invention may include a seat harness system 100 with single-action release functionality. The seat harness system 100 may define a multi-point harness system when operatively associated with a seat 10; in some embodiments resulting in a five-point car seat harness system. It should be understood that even though the FIGS. and much of the specification is directed toward car seats, the seat harness system 100 may be adapted to be associated with stroller seats, highchairs, a baby-carrier (e.g., Babybjorn™), as well as seats for adults, such as vehicular driving seats, passenger seats, cockpit seats and the like.

In any event, the seat 10 may have a back-support portion and a seat portion to accommodate the weight of a user of the seat 10. The seat portion may provide a locking mechanism receiver 48 adapted to move between a locked and an unlocked engagement for a complimentary locking mechanism. (Though in certain embodiments, the locking mechanism receiver 48 may be located not on the seat portion). Also, the back-support portion may provide an actuator accommodator 50 to connect an actuator 60 to the seat 10. In certain embodiments, the actuator accommodator 50 may be a recessed pocket for housing the actuator 60 therein.

The seat harness system 100 operatively associates a harness plate 36, harness strapping 32, a harness positioning system 70, and the actuator 60 in a singular innovation.

The harness plate 36 and the harness strapping 32 may be made from any durable, rigid or semi-rigid material capable of bending without fracture under the stresses and stains contemplated herein, such as various synthetic materials, hard rubber, various plasticized material, metallic materials and the like. In some embodiments, the harness strapping 32 may be flexible much like a standard seatbelt strap.

The harness plate 36 may have a body portion having an upper portion, side portions, and a bottom portion. It being understood that directional terms such as upper, lower, side, and the like are used in relation to the illustrative embodiment of FIG. 1 showing the present invention in a closed position where the upper (upward or top) direction being toward the top of the corresponding figure and the downward (lower or bottom) direction being toward the bottom of the corresponding figure.

The upper portion of the harness plate 36 may provide a plate pivot point 38, which could be a hinge or other pivotable connectors. The bottom portion may provide locking arm 42 ending in a locking mechanism 46. In certain embodiments, side arms 40 extend from the side portion of the harness plate 36 so that when in the closed position, a five-point harness system is established and defined by the locking arm 42, the two side arms 40, and the harness strapping 32. The harness plate 36 may provide an actuating component 44 enabled to send a control signal to the actuator 60 and an input to the locking mechanism receiver 48, moving the latter between the locked and unlocked engagements. The actuating component 44 may be a press and twist lock dial or equivalent.

Figure 5:
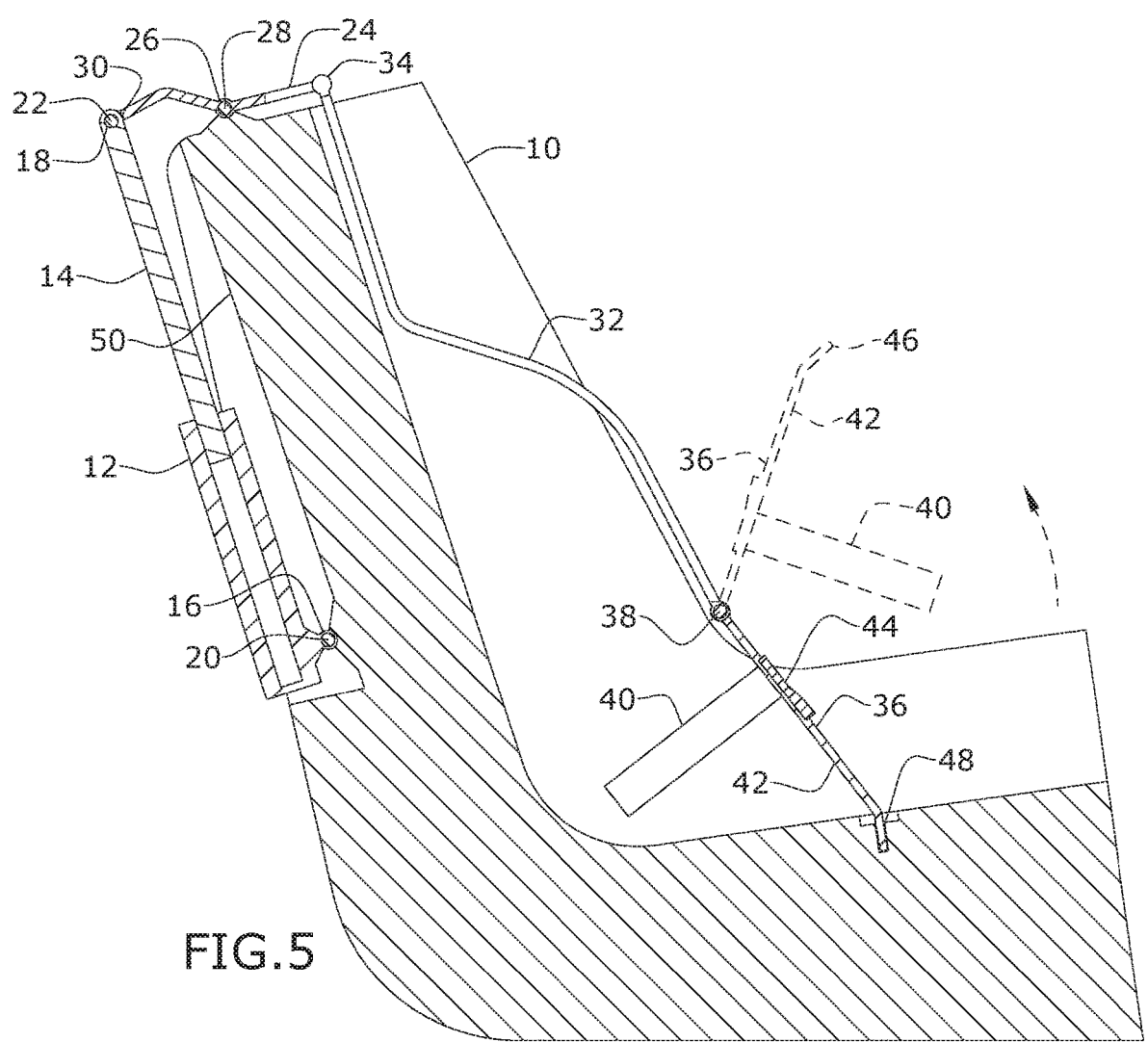
FIG. 5 is a section view of an exemplary embodiment of the present invention, taken along line 5-5 of FIG. 1, illustrating a harness plate 36 moving between an engaged condition to a disengaged condition.

The harness positioning system 70 may include a fulcrum point 26 operatively associated with a lever arm 24, wherein the fulcrum point 26 engages the lever arm 24 between an actuating end of the lever arm 24 and a strapping end of the lever arm 24. The lever arm 24 may have a biplanar shape, wherein the lever arm 24 lies in two planes, as illustrated in FIG. 5. The fulcrum point 26 may associated with the lever arm between the two (first and second) planes, along an inclined, interconnecting plane therebetween, to effectuate the operability of the functionality disclosed herein. The fulcrum point 26 may include, in certain embodiments, a pin opening in an upper portion of the back support portion of the seat 10, wherein the fulcrum point 26 operatively associates with a fulcrum pin 28 engaging the lever arm 24.

Figure 6:
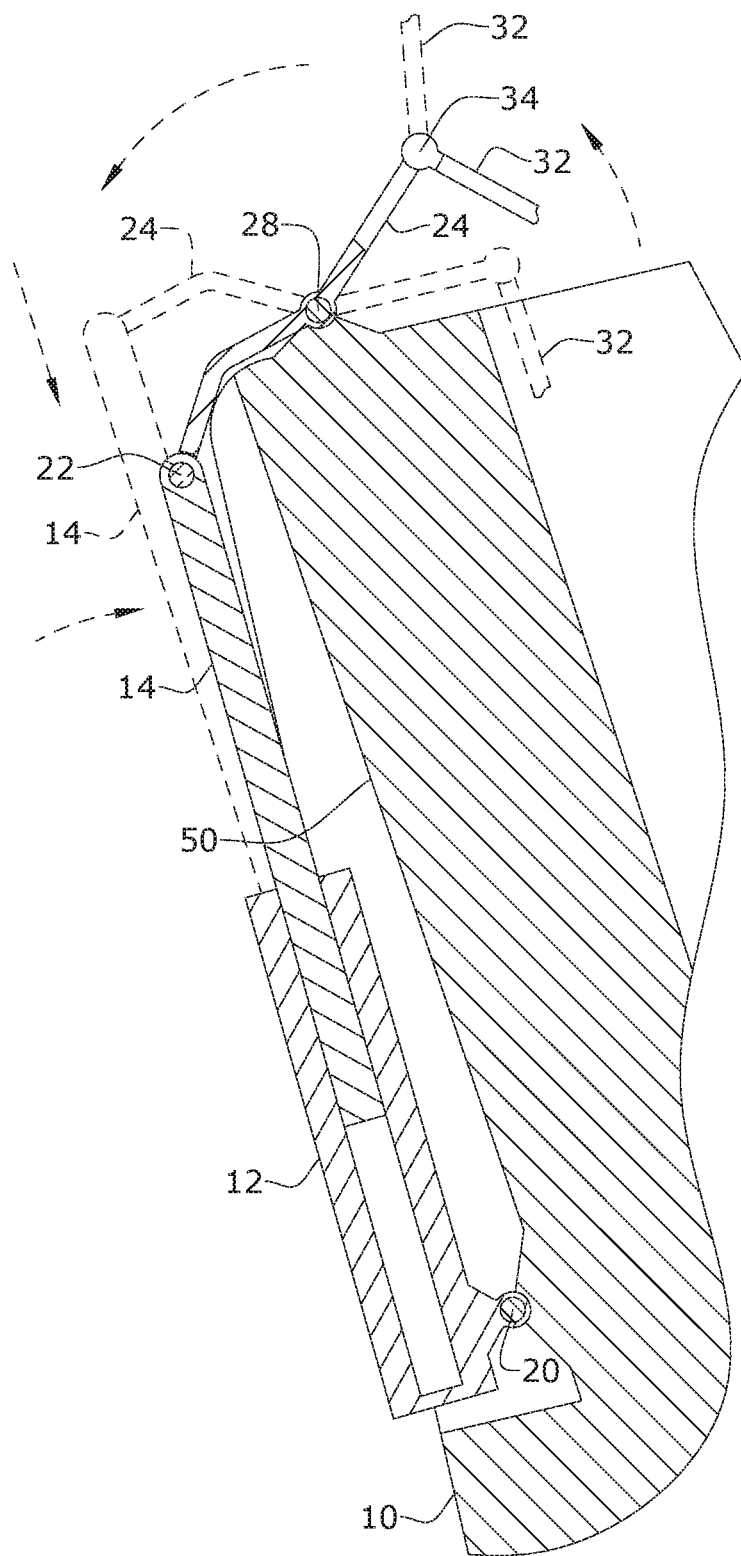
FIG. 6 is an enlarged detailed section view of an exemplary embodiment of the present invention, illustrating (a) an actuation connection point 22 moving between a closed condition to an open condition, which in turn urges one or more strapping pivot points of the lever arm 24 to move, about the fulcrum point 28, from the closed position to the open position; and (b) the harness strapping 32 moving from an engaged position to a disengaged position by way of the one or more pivotable connection points 34.

The strapping end of the lever arm 24 may provide one or more strapping pivot points that are pivotably connected to one or more pivotable connections 34 of the upper portion of the harness strapping 32 so that the harness strapping 32 is movable between an engaged condition and a disengaged condition, as illustrated in FIG. 6. It being understood that the "pivotable connections 34" could be on the strapping end of the lever arm 24 and in fact be the strapping pivot points, even though the Figures show the pivotable connections 34 on the harness strapping 32.

The actuating end of the lever arm 24 may provide an actuator connection point 22 engaging the actuator 60. The actuator 60 being adapted in such a way that when it receives the control signal from the actuating component 44, the actuator 60 responds by converting a source energy into mechanical energy moving the actuation connection point 22 between a closed condition to an open condition, as illustrated in FIG. 6. The source energy may be pneumatic or hydraulic pressure, an elastic object that stores the mechanical energy, spring-loading, ball-bearings, an articulating hinge, or the like. In the embodiment shown in the Figures, the actuator 60 is a hydraulic pump utilizing hydraulic pressure through a hydraulic piston body 12, a hydraulic piston shaft 14, a hydraulic piston body pin opening 16, a hydraulic piston shaft pin opening 18, a hydraulic piston body pin 18, and a shaft pin and a shaft receive 30 as part of the actuation connection point 22. In the embodiment of the hydraulic actuator 60, when a user moves the harness plate 36 to the closed position a hydraulic pump associated with the hydraulic actuator 60 is primed with such source energy. The control signal could be pneumatic or hydraulic pressure or the like.

A method of using the present invention may include the following. The seat harness system 100 disclosed above may be provided. In one embodiment, the seat 10 is a car seat secured to a seat of a car. In the car seats "open position" (FIG. 2) the single-piece five-point chest plate harness is suspended over where a seated child would be, reminiscent of an awning. Though, it should be understood that the seat harness system 100 can be made to open downwardly or laterally (to the right or left) as opposed to the instant over-the-head design.

A caretaker may place a child in the car seat and lower the harness, and in so doing lowers the strapping end of the harness positioning system 70/lever 24 that is connected to the harness strapping 32 via the pivot connection point 34, which in turn raises the opposing actuator end of the harness positioning system 70/lever arm 24—supplying the actuator 60 with the source of energy in the form of, in the illustrated embodiment, hydraulic pressure, "priming" the actuator 60.

The caretaker may secure the harness plate 36 into the locking receiver 48 until it moves to the locked condition, in certain embodiments producing a "click" from the actuating component 44, thereby indicating the harness plate 36 is securely locked. When removing the child from the car seat, the caretaker may simply engage the actuating component 44 (in certain embodiments by pressing then twisting the lock release button/dial) which triggers the actuator 60 by way of the above-mentioned control signal, moving the harness strapping 32 out and over the child's head, back to its open position. Note, the harness strapping 32 may be pivoted about the one or more pivotable connection points 34 to further "open" the open position. Likewise, the harness plate 36 may be pivoted about the plate pivot point 38 to further "open" the open position.

As a result, the present invention solves the problem of fishing for belts and latching multiple buckles that bedevils users of current five-point harnesses. It also eliminates the risk of loose or twisted straps, thereby making it not only more efficient, time-saving and convenient, but also making it safer than the ubiquitous five-point strap harnesses used today.

It should be understood, of course, that the foregoing relates to exemplary embodiments of the invention and that modifications may be made without departing from the spirit and scope of the invention as set forth in the following claims.

The invention claimed is:

1. A method of securing a harness comprising the steps of: providing a harness system comprising:
    a seat
    a locking mechanism receiver;
    a harness plate having a locking mechanism, an actuating component and a plurality of engagement points, the harness plate being movable between an open position and a closed position;
    wherein the harness plate and the plurality of engagement points is configurable from a locked engagement to an unlocked engagement with a single input to the actuating component;
    the actuating component operatively associated with an actuator that is configured to move the harness plate between the open position and the closed position;
    a lever arm linked to the actuator;
    a harness strapping interconnecting the harness plate and the lever arm;
    a fulcrum point operatively associated with the lever arm;
  lowering the harness plate such that the locking mechanism engages with the locking mechanism receiver; and
  activating the actuating component to cause the locking mechanism to disengage from the locking mechanism receiver and to cause the actuator to move the lever arm in a manner that moves the harness plate to the open position.

2. The method of claim 1 wherein the harness plate comprises a first side arm and a second side arm.

3. The method of claim 2, whereby the harness strapping is formed of a material that is capable of bending without fracture.

4. The method of claim 2, whereby the material is rigid.

5. The method of claim 2, whereby the material is semi-rigid.

* * * * *